United States Patent [19]
Yamaoka et al.

[11] Patent Number: 6,149,064
[45] Date of Patent: Nov. 21, 2000

[54] IC CARD READER

[75] Inventors: Mamoru Yamaoka; Kazunori Takahashi; Shigeyuki Nagata, all of Nagano, Japan

[73] Assignee: Kabushiki Kaisha Sankyo Seiki Seisakusho, Nagano, Japan

[21] Appl. No.: 09/262,842

[22] Filed: Mar. 5, 1999

[30] Foreign Application Priority Data

| Mar. 6, 1998 | [JP] | Japan | 10-055577 |
| Mar. 11, 1998 | [JP] | Japan | 10-060220 |
| Mar. 11, 1998 | [JP] | Japan | 10-060221 |

[51] Int. Cl.[7] ............................ G06K 13/04; G06K 13/00
[52] U.S. Cl. .................................... 235/479; 235/482
[58] Field of Search ........................ 235/482, 475–481, 235/441, 483, 486, 487, 492

[56] References Cited

U.S. PATENT DOCUMENTS

| 3,940,796 | 2/1976 | Haun et al. ........................... 235/449 |
| 4,575,703 | 3/1986 | Saishido ............................... 235/482 |
| 4,598,479 | 7/1986 | Baus ..................................... 33/129 |
| 4,839,509 | 6/1989 | Yasuma et al. ....................... 235/482 |
| 4,907,257 | 3/1990 | Asano et al. ......................... 379/144 |
| 4,976,630 | 12/1990 | Schuder et al. ..................... 439/260 |
| 4,990,758 | 2/1991 | Shibano et al. ..................... 235/479 |
| 5,336,877 | 8/1994 | Baab et al. .......................... 235/475 |
| 5,559,317 | 9/1996 | Wong et al. ......................... 235/449 |

*Primary Examiner*—Thien M. Le
*Attorney, Agent, or Firm*—Sughrue, Mion, Zinn, Macpeak & Seas, PLLC

[57] ABSTRACT

A contact carriage 2 is movably provided in an opening 12 formed in a frame 11 having a card path 8 into which an IC card 9 is inserted, and of the opposed side faces defining the opening 12, the side face 13b which confronts a carriage movement reference surface 17 used when the contact carriage 2 moves in the opening 12 includes a flat portion 14a and a arcuately protruded portion 15a.

21 Claims, 6 Drawing Sheets

IC CARD READER

BACKGROUND OF INVENTION

1. Field of the Invention

The present invention relates to an IC card reader.

2. Related Art

Figure 7:
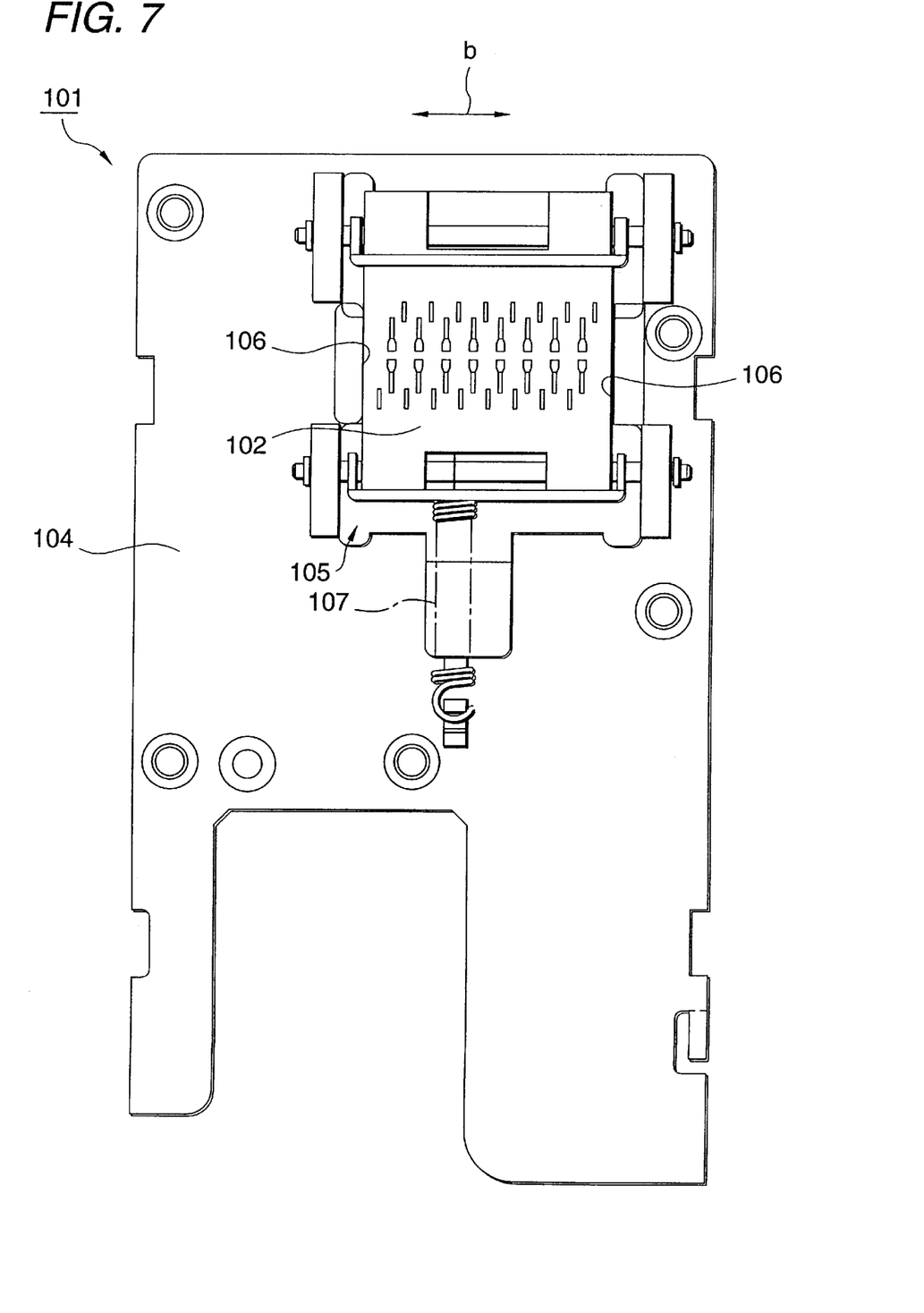
FIG. 7 is a plan view showing a conventional IC card reader.

A typical conventional IC card reader 101 is shown in FIG. 7. As shown, the IC card reader 101 includes with a contact array (not shown) which is brought into contact with a contact terminal pattern of an IC card for communication with the IC card, and a contact carriage 102 which is movable supporting the contact array. To bring the contact array into contact with the IC card or break the contact, the contact carriage 102 is moved obliquely to the moving direction of the IC card by a link mechanism. The contact carriage 102 is positioned or positionally regulated in the directions b perpendicular to the card moving direction by guiding the side faces of the contact carriage 102 by the side faces 106 of or defining an opening 105 formed in a frame 104.

In the structure where the contact carriage 102 is positioned in its lateral directions b by the utilization of the frame 104, the guide portions including the side faces 106 are long. Therefore, the load is likely to be large, and a returning coiled spring 107 of a strong spring force is required. And a reaction force of the IC card generated when it is manually operated is large, and this makes it difficult to handle the IC card reader 101.

The structure having the long guide portions formed with the side faces 106 has the following problems. It is difficult to secure a satisfactory dimensional-accuracy for the guide width of the guide portions. The lateral distance between the side faces 106 is reduced, a clearance between them is too large, and it is difficult to position the arrayed contacts of the contact carriage 102 to the contact terminal pattern of the IC card.

There is known an IC card reader equipped with a detecting device with a plate spring located in the card path for the detecting means for detecting that the IC card is inserted up to the insertion end position is used for the conventional IC card reader. The detecting device detects the insertion of card by use of a motion of the plate spring in the card thickness direction. Because of this, the detecting device cannot handle the IC cards of different thickness. For example, a thick IC card is inserted, and the detecting device operates to detect the arrival of the IC card at the insertion end position. At this time, the contact carriage being lowered does not yet reach a satisfactory level, however. Therefore, the contacts do not come in contact with the IC card. Thus, the card position to be detected is not coincident with a correct one. If the IC card reader commences its communication with the IC card performed under this condition, it will fail to communicate with the IC card.

There is known an IC card reader in which the card insertion detecting device is combined with a card lock mechanism. In the card reader, the arrival of the inserted IC card at the insertion end position is detected, and then the lock mechanism operates to drive a solenoid and to lock the IC card. In case where the card, which is locked within the IC card reader, has some play, there is a danger that the card is unlocked even during communication. To be more precise, when an operator pulls the IC card under communication from the IC card reader or moves such a card in the card moving directions, the card moves a subtle distance and is out of a detecting range provided for the card insertion detecting means, and consequently the solenoid of the lock mechanism operates to remove the locking state. Therefore, this conventional IC card reader is always placed in a danger that the IC card is pulled out of the IC card reader before data communication is not completed. This gives rise to serious problems in utilizing the data.

SUMMARY OF INVENTION

Accordingly, a first object of the present invention is to provide an IC card reader which is able to easily and accurately position a contact carriage, which moves carrying a contact array thereon, in the direction of the width (lateral direction) with respect to the card moving direction. A second object of the invention is to provide an IC card reader which can accurately detect a card position irrespective of card thickness difference, and can detect that the contact carriage fails to return. A third object of the invention is to provide an IC card reader which can reliably lock an IC card inserted thereinto and prevent the IC card from being mistakenly unlocked during data communication.

According to an aspect of the present invention, there is provided an IC card reader comprising:

a contact carriage moving, with insertion of the IC card, to a card insertion end position and to a contact position where said contacts come in contact with said contact terminal pattern; and an opening formed in a frame having a card path into which an IC card is inserted, through which said contact carriage is freely movably provided, wherein a side face of said contact carriage, located closer to a carriage movement reference surface used when said contact carriage moves with respect to said opening, and a side face of said opening which faces said side face of said contact carriage are each formed to have an arcuately protruded portion and a flat portion.

According to another aspect of the present invention, there is provided an IC card reader comprising:

contacts to be in contact with a contact terminal pattern of an IC card;

a contact carriage for carrying said contacts thereon, said contact carriage moving with insertion of the IC card to a contact position where said contacts come in contact with said contact terminal pattern at a card insertion end position;

a frame having a card path into which the IC card is inserted;

an opening formed in said frame so as to allow the movement of said contact carriage therein;

a carriage movement reference surface for positionally regulating said contact carriage moving in said opening; and one of the side face of said contact carriage, which confronts said carriage movement reference surface, and the side face defining said opening, which confronts said side face of said contact carriage being flat, while the other side face being arcuate.

According to the present invention, a contact carriage is provided in an opening formed in a frame having a card path into which an IC card is inserted, and of the opposed side faces of the opening, the side face serving as a carriage movement reference surface when the contact carriage moves with respect to the opening, includes an arcuately protruded portion and a flat portion. With this construction, the contact carriage moving in the opening is positionally regulated and highly accurately positioned. Therefore, the contact array of the contact carriage is accurately brought into contact with a predetermined position of the IC card, and hence reliable data communication is ensured.

DETAILED DESCRIPTION OF PREFERRED EMBODIMENTS

The present invention will be described in detail with reference to the accompanying drawings.

Figure 1:
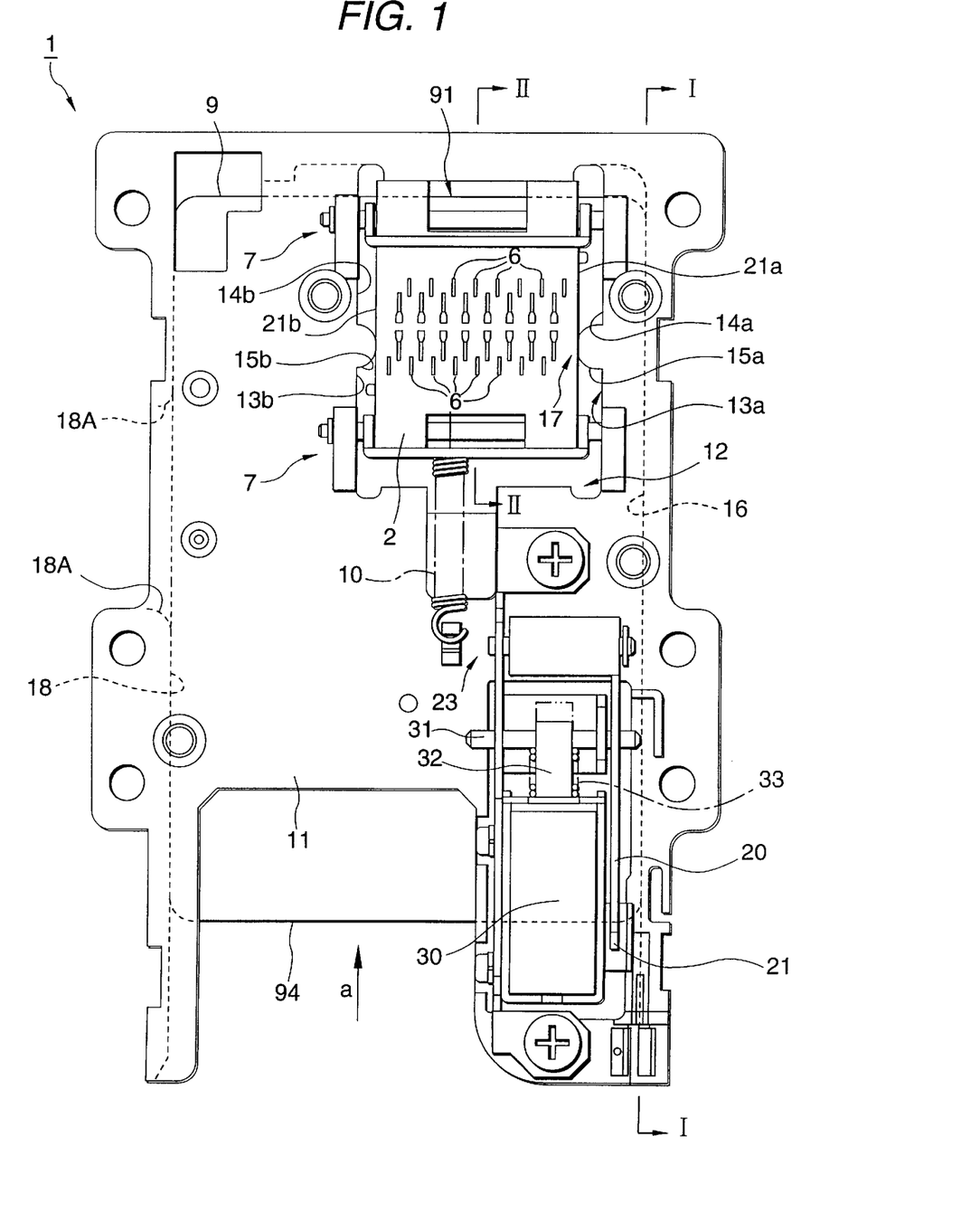
FIG. 1 is a p an view showing an embodiment of an IC card reader.
Figure 2:
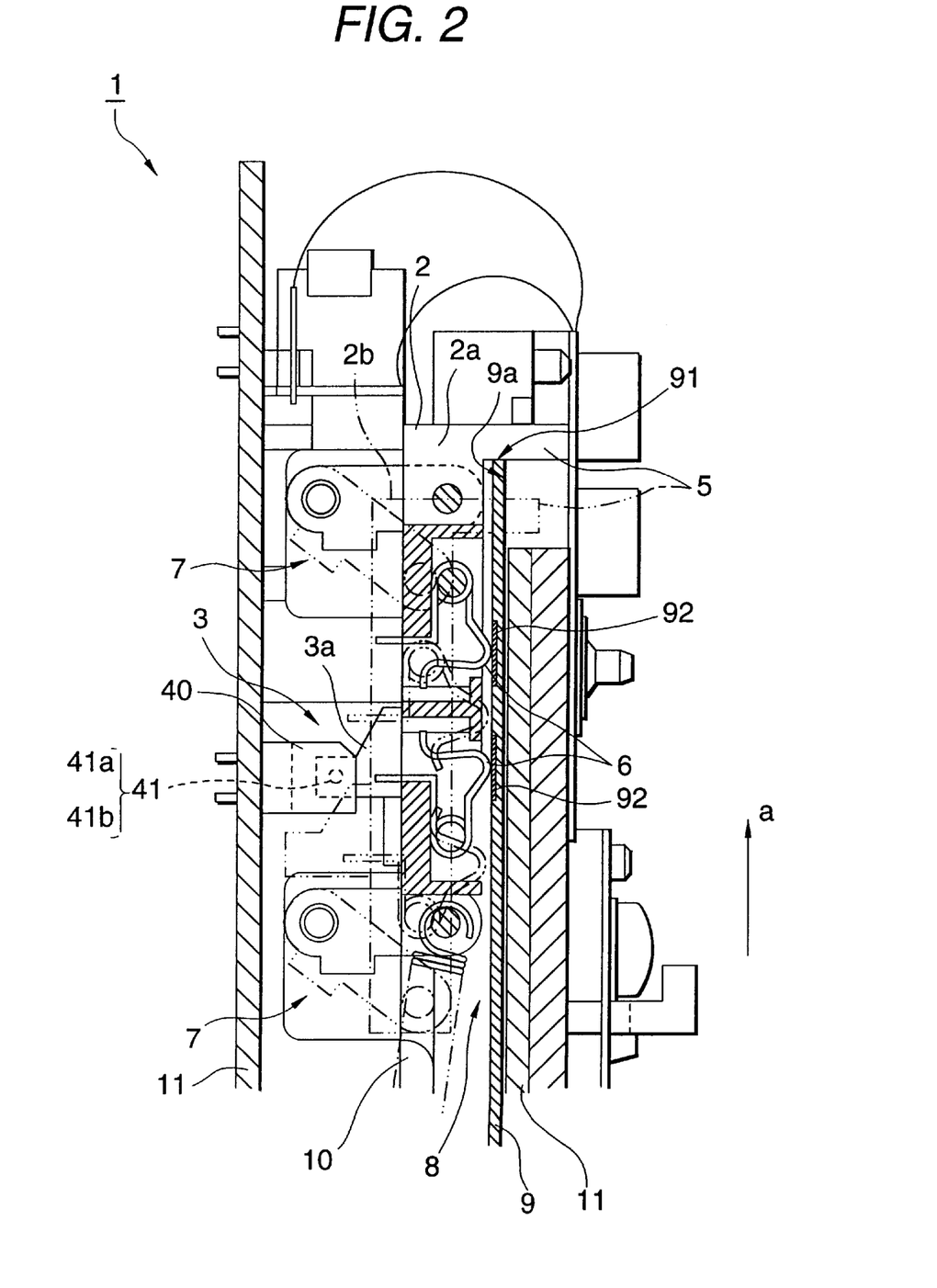
FIG. 2 is a cross sectional view taken on line II—II in FIG. 1.
Figure 3:
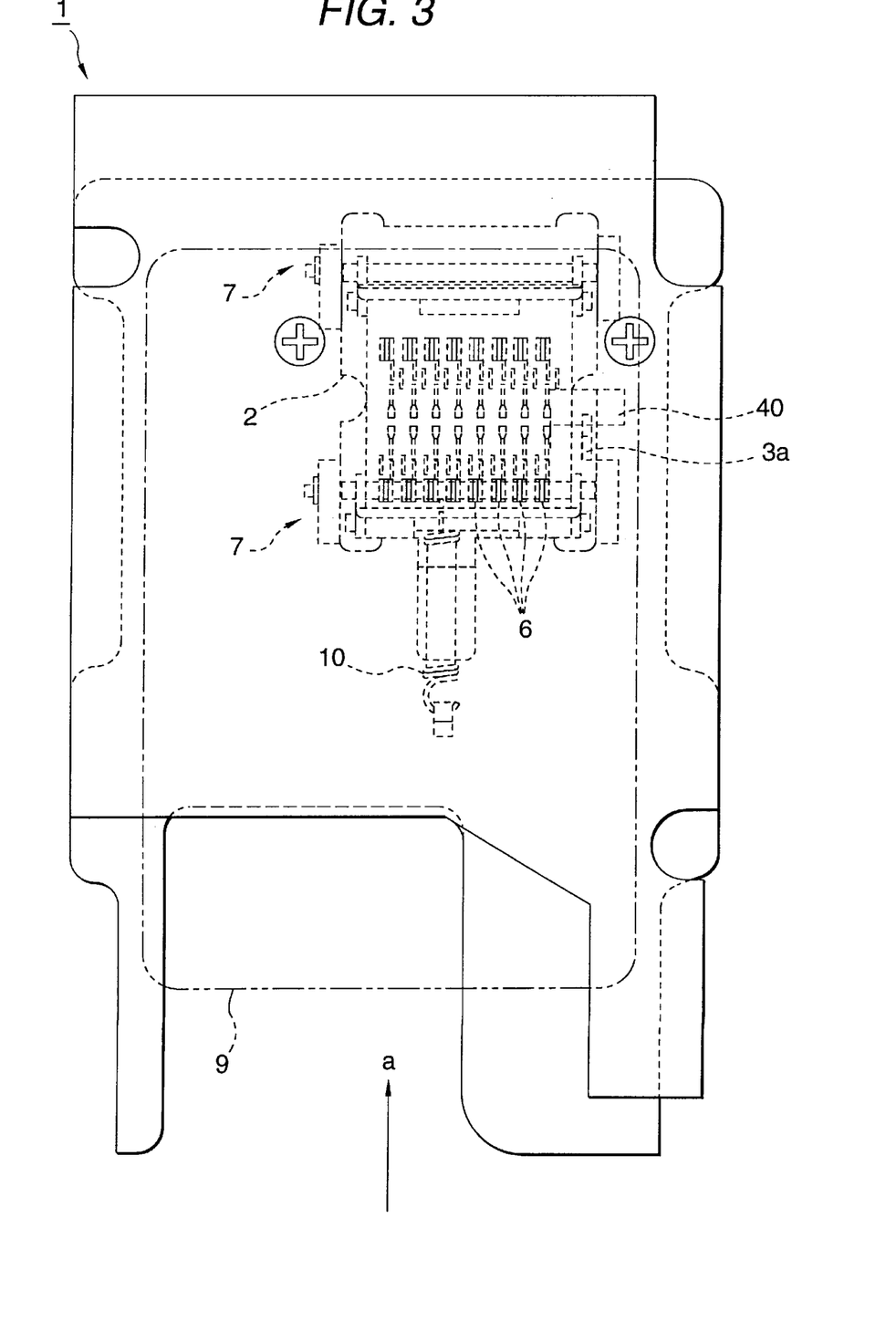
FIG. 3 is a plan view showing a positional relationship between a contact carriage 2 and optical means 40 in the IC card reader of FIG. 1.

Referring to FIGS. 1 to 3, there is shown an embodiment of an IC card reader according to the present invention. As enlargedly shown in FIG. 2, an IC card reader 1 includes an array of resilient contacts 6 to be given later and a contact carriage 2. The contacts 6 come in contact with a contact terminal pattern 92 usually formed on an IC card 9. The contact carriage 2 is moved, with insertion of the IC card 9 into the IC card reader, toward a contact position 2a, and is brought into contact with the contact terminal pattern 92 at a card insertion end position 9a. As shown in FIG. 1, the contact carriage 2 is movably provided in an opening 12 of a frame 11 of the IC card reader 1. When moved, the contact carriage 2 is guided by a side face 13a of or defining the opening 12 (which is opposed to a side face 13 b thereof) serving as a carriage movement reference surface 17, while being positionally regulated.

The contact carriage 2 includes a card contact portion 5 and contacts 6. The leading edge 91 of the IC card 9, when inserted, is abutted on the card contact portion 5 of the contact carriage. The contacts 6 of the contact carriage are brought into contact with a contact terminal pattern 92 formed on the IC card 9. When the IC card 9 is inserted into the IC card reader, the contact carriage 2 obliquely moves and, at the card insertion end position 9a, is moved toward the contact position 2a. In the present embodiment, the contact carriage 2 is supported by a frame 11 of the IC card reader 1 such that it is obliquely movable while keeping its attitude parallel to a card path 8 with the aid of a parallel link mechanism or a parallel linkage 7 (FIG. 2). The frame 11 is made of a steel plate or a substrate, and if necessary, it may be molded into a one-piece construction having a card path 8 for receiving the IC card 9. The contact carriage 2 is disposed close to one end of the frame 11 as shown in FIG. 1. The parallel link mechanism 7 includes a couple of links as shown in FIG. 2, and moves the contact carriage 2 parallel to the card path by swinging the links. In the embodiment, the contact carriage 2 moves tracing an arcuate path as shown, and hence may vary its distance to the card path 8 to bring the contacts 6 thereof into contact with the contact terminal pattern 92 of the IC card 9, and detach the former from the latter. Urging means 10 urges the contact carriage 2 in the direction opposite to the direction a with an arrowhead, viz., the direction to discharge the IC card 9 out of the IC card reader. Therefore, when the IC card 9 is not inserted into the IC card reader, the contact carriage 2 is located at a non-contact position (stand-by position) 2b indicated by a two-dot chain line in FIG. 2.

At the upper portion of the contact carriage 2 (indicated by the arrow direction a), the card contact portion 5 is protruded crossing the card path 8. Therefore, when the leading edge 91 of the IC card 9 hits the card contact portion 5, the card contact portion 5 is pushed in the direction a to move the contact carriage 2 parallel to the card path.

The contacts 6 are provided on one of the side faces of the contact carriage 2. When the contacts 6 come in contact with the IC card 9, the IC card reader writes data into and reads it out of the IC card 9. In the embodiment, two series of contacts 6 are arrayed in the card moving directions a, as seen from the protruded terminals of the contacts 6 shown in FIG. 1. Each contact 6 consists of a coiled steel wire located within the contact carriage 2. One end of the coiled steel wire is fixed to the contact carriage 2, while the other end is extended from the coiled part and bent outward beyond the surface of the contact carriage 2 to form a part to resiliently contact with the contact terminal pattern 92 of the IC card 9. The contacts 6 are positioned so as to confront the contact terminal pattern 92 of the IC card 9 when the leading edge 91 of the IC card 9 hits the card contact portion 5 of the contact carriage 2. When the IC card 9 is further inserted, the contact carriage 2 is moved in the direction a a distance corresponding to a further insertion of the IC card 9. The contacts 6, which confront the contact terminal pattern 92, move to and come in contact with the contact terminal pattern 92. In this case, the contacts 6 are brought into contact with the contact terminal pattern 92 before the IC card 9 reaches the card insertion end position 9a, as a matter of course. The contacts 6 thus brought into contact with the contact terminal pattern 92 approach to the IC card 9. At this time, the contacts 6 resiliently contact with the contact terminal pattern 92. Therefore, a good contact state is secured between them. In this contact state of the contacts 6, communication with the IC card 9 is performed. Therefore, the contacts 6 are preferably formed of wires being electrically conductive and elastic, e.g., copper wires.

Figure 5:
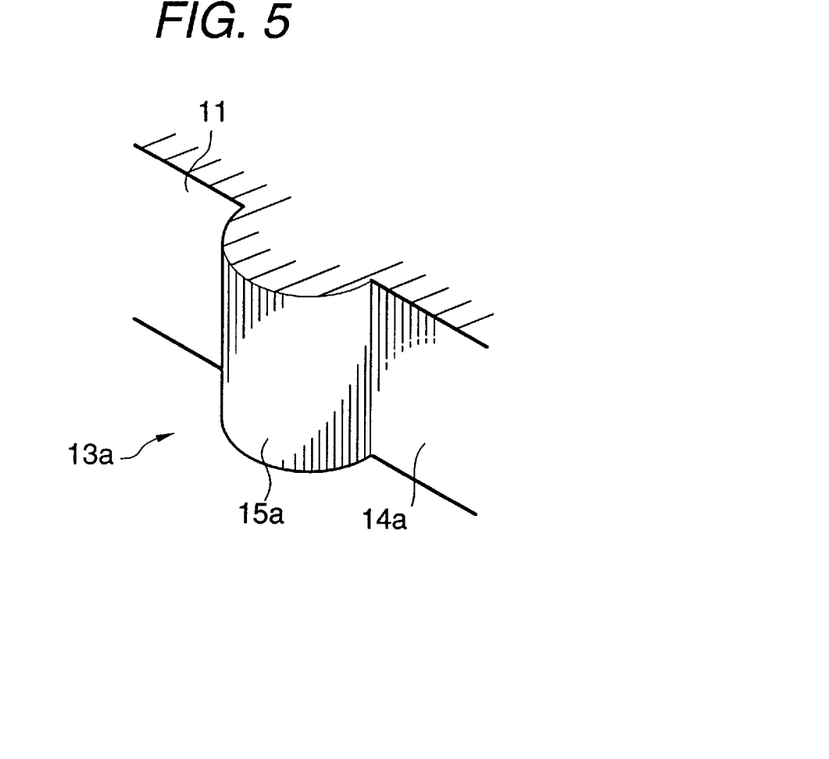
FIG. 5 is a partial, perspective view showing an arcuately protruded portion of a movement reference surface.

The opening 12, in which the contact carriage 2 is provided so as to be movable between the stand-by position where it is separated from the contact terminal pattern 92 of the IC card 9 and the card insertion end position where the contacts 6 are in contact with the contact terminal pattern 92, is formed in the frame 11 to be larger than the contact carriage 2. The side faces 13a and 13b, opposed to each other, of the opening 12 confront the side faces 21a and 21b of the contact carriage 2, respectively. Of those side faces 21a and 21b, the side face 21a located to the right in FIG. 1 is close to a reference guide face 16 for positioning the card when it is moved. Therefore, a carriage movement reference surface 17 for positioning the contact carriage 2 is formed on the side face 13a facing the side face 21a. In the embodiment, the side face 13a, as shown in FIG. 5, includes a flat portion 14a and an arcuately protruded portion 15a, which is configured like a semi-circular pillar. The arcuately protruded portion 15a serves as a carriage movement reference surface 17 the top of which is always in contact with the side face 21a of the contact carriage 2, and positionally regulates the moving contact carriage 2 in the direction of the width. In this case, the contact carriage 2 may be urged toward the carriage movement reference surface in the width direction by use of urging means (not shown). If so done, the side face 21a of the contact carriage 2 reliably contacts with the arcuately protruded portion 15a as the carriage movement reference surface 17.

In the embodiment, a structure on the side face 21b of the contact carriage 2, opposed to the side face 21a thereof including the carriage movement reference surface 17, is also designed such that the side face 13b of the opening 12 has a flat portion 14b and an arcuately protruded portion 15b. The side faces 13a and 13b of the opening 12, opposed to each other, are symmetrically configured as shown in FIG. 1; the side faces 21a and 21b of the contact carriage 2, respectively, come in contact with the arcuately protruded portions 15a and 15b of the opening 12 at points positioned symmetrically with respect to the vertical center line of the opening 12.

In the embodiment illustrated, the arcuately protruded portions 15a and 15b are formed integral with the side faces 13a and 13b of the opening 12 of the frame 11. If required, those portions 15a and 15b may be formed separately from the frame 11. In an example of this, separate members are screwed to the frame 11 in a state that it is movable in the width direction (lateral direction in FIG. 1) of the contact carriage 2, by the utilization of elongated holes. That is, the separate members are mounted to the frame 11 so as to finely adjust contact states of them with the contact carriage 2. In another example, separate members are mounted on the frame 11 while being urged toward the contact carriage 2, and positioned while being in contact with the contact carriage 2.

In the thus constructed IC card reader 1, the carriage movement reference surface 17 is provided in the opening 12 of the frame 11, and the contact carriage 2 is moved in parallel to the card path in a state that the side face 21a of the contact carriage 2 is in contact with the carriage movement reference surface 17. Therefore, the moving contact carriage 2 is positionally regulated in the direction of the width of the carriage, and in this state (carriage being thus positioned) the contacts 6 arrayed on the contact carriage 2 are brought into contact with the contact terminal pattern 92 of the IC card 9. Further, it is noted that the carriage movement reference surface 17 consists of the arcuately protruded portion 15a that is included or provided in connection with the side face 13a of the opening 12. A contact surface between the arcuately protruded portion 15a and the side face 21a of the contact carriage 2 is small. Hence, a friction at the contact surface little hinders the movement of the contact carriage 2.

Figure 6:
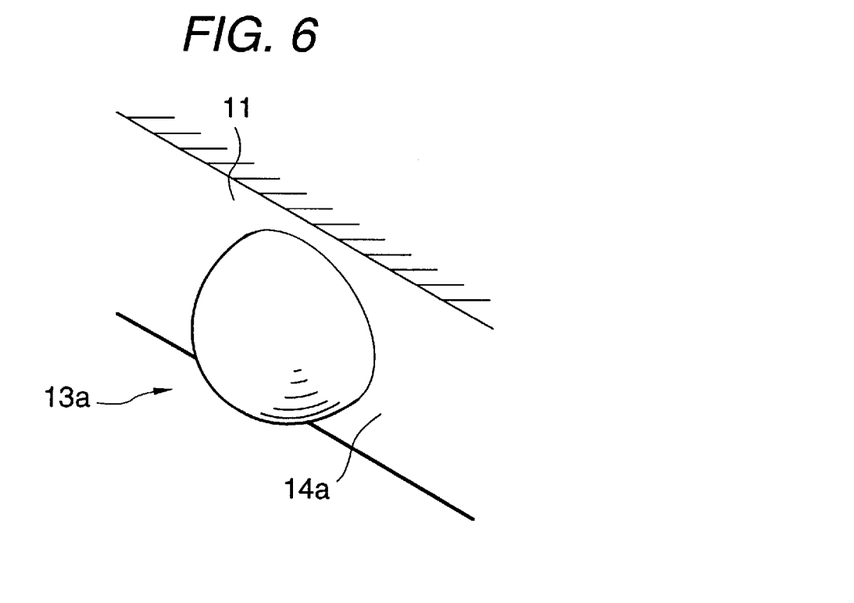
FIG. 6 is partial, perspective view showing another curved surface forming a movement reference surface.

In the embodiment, the arcuately protruded portions 15a and 15b are semicircular in cross section or configured like a semi-circular pillar, as shown in FIG. 1. In an alternative, the carriage movement reference surface may be configured like a spherical protrusion as shown in FIG. 6. In this case, the spherical protrusion is brought into a point contact with the side face 21a of the contact carriage 2. Therefore, the contact carriage 2 more smoothly slides on the protrusions. In another alternative, the carriage movement reference surface may be constructed with a ball that is rotatably buried in the frame 11. This alternative further reduces the contact friction.

In the above-mentioned embodiment, the protrusions are formed on the side faces 13a and 13b of the frame, one for one side face, so as to be in contact with the side faces 21a and 21b of the contact carriage 2. In an alternative, a plural number of arcuately protruded portions are formed on only one side face 13a (13b). Further, the arcuately protruded portions may be formed on both the side faces 21a and 21b of the contact carriage 2 or only the side face of the contact carriage, which faces the carriage movement reference surface.

The IC card reader 1 is provided with detecting means including optical means 40 for detecting that an IC card 9 reaches the card insertion end position 9a (FIG. 2). This detecting means including the optical means 40 will be described hereunder.

As described above, as shown in FIG. 2, the contact carriage 2 is provided between a couple of frames 11 constituting the IC card reader 1 such that the contact carriage 2 is obliquely moved by the parallel link mechanism 7 while keeping its attitude parallel to the card path 8. In the embodiment, the contact carriage 2 moves tracing an arcuate path as shown, and hence may vary its distance to the card path 8 to bring the contacts 6 thereof into contact with the contact terminal pattern 92 of the IC card 9, and detach the former from the latter.

At the upper portion of the contact carriage 2 (indicated by the arrow direction a), the card contact portion 5 is protruded crossing the card path 8. Therefore, when the leading edge 91 of the IC card 9 hits the card contact portion 5, the card contact portion 5 is pushed in the direction a to move the contact carriage 2 in parallel with the card path.

In the embodiment, the contact carriage 2 is provided with an opening member 3 in cooperation with the optical means 40 for its effective operation. To detect arrival of the IC card 9 at the card insertion end position 9a, the opening member 3 is operated, together with the contact carriage 2. The optical means 40 as the counter part of the opening member 3 is fastened onto the frame, for example, of the IC card reader 1. A card position is detected by a position of the opening member 3 of the contact carriage 2 relative to the detecting means 40. In the embodiment, the optical means 40 is constructed with a photo detecting device 41 with a light emitting part 41a and a light sensing part 41b, e.g., a photo interrupter. The opening member 3, associated with the optical means 40, is arranged such that when operated, it interrupts a light beam emitted from the light sensing part 41b. More specifically, the opening member 3 is constructed with a shield plate 3a formed integral with the contact carriage 2. The shield plate 3a is turned into and out of a space between the light emitting part 41a and the light sensing part 41b. The combination of the photo detecting device 41 and the shield plate 3a, which makes up the detecting means, is located at such a position where the arrival of the IC card 9 at the card insertion end position 9a is detected upon interruption of the light beam by the shield plate 3a in order that data communication with the IC card 9 is performed in response to a detecting output from the photo detecting device 41.

As described above, the detecting means of the IC card reader 1 detects a position of the IC card 9 not directly but through a motion of the contact carriage 2 by use of the opening member 3. Therefore, the detecting means can accurately detect a position of the IC card 9 in its moving direction irrespective of some thickness difference of the IC card 9. Thus, the IC card reader detects, on the basis of the motion of the contact carriage 2, that the IC card 9 reaches the card insertion end position 9a, and the contacts 6 reliably contacts with the IC card 9, and then commences its communication with the IC card. In case where some thickness difference of the IC card is present and it causes a timing error of commencing data communication, the IC card reader can absorb the timing error. The thickness difference of the IC card does not produce a deviation of the detected card position from its correct position. To bring out this advantageous feature of the invention, in the IC card reader 1, the dimension of the card path 8 in the direction of the width of the IC card 9 is selected to be somewhat larger than the required one so as to receive the IC cards of different thickness values. The thus constructed IC card reader 1 can also detect such an unwanted situation where after the IC card 9 is pulled out, the contact carriage 2 does not return to its original position, or the non-contact position 2b, through a detected motion of the opening member 3 of the contact carriage 2.

While in the detecting means mentioned above, the shield plate 3a is integral with the contact carriage 2, the shield plate 3a may be formed at any other suitable location than the contact carriage 2. In a specific example, the shield plates 3a are provided on the links of the parallel link mechanism 7, and the photo detecting devices 41 are located at proper locations in connection with the shield plates 3a. In the example, when the contact carriage 2 moves in parallel with the card path 8, the shield plates 3a are swung together with the links.

In the detecting means mentioned above, the opening member 3 is formed with the shield plate 3a, and the optical means 40 is formed with the photo detecting device 41. Alternatively, the detecting means may be constructed with a microswitch driven by the contact carriage 2. When the contact carriage 2 is moved, the microswitch is operated to detect the arrival of the IC card 9 at the card insertion end position 9a. In this sense, the microswitch may correspond to the optical means 40, and the contact carriage 2 may correspond to the opening member 3.

Figure 4:
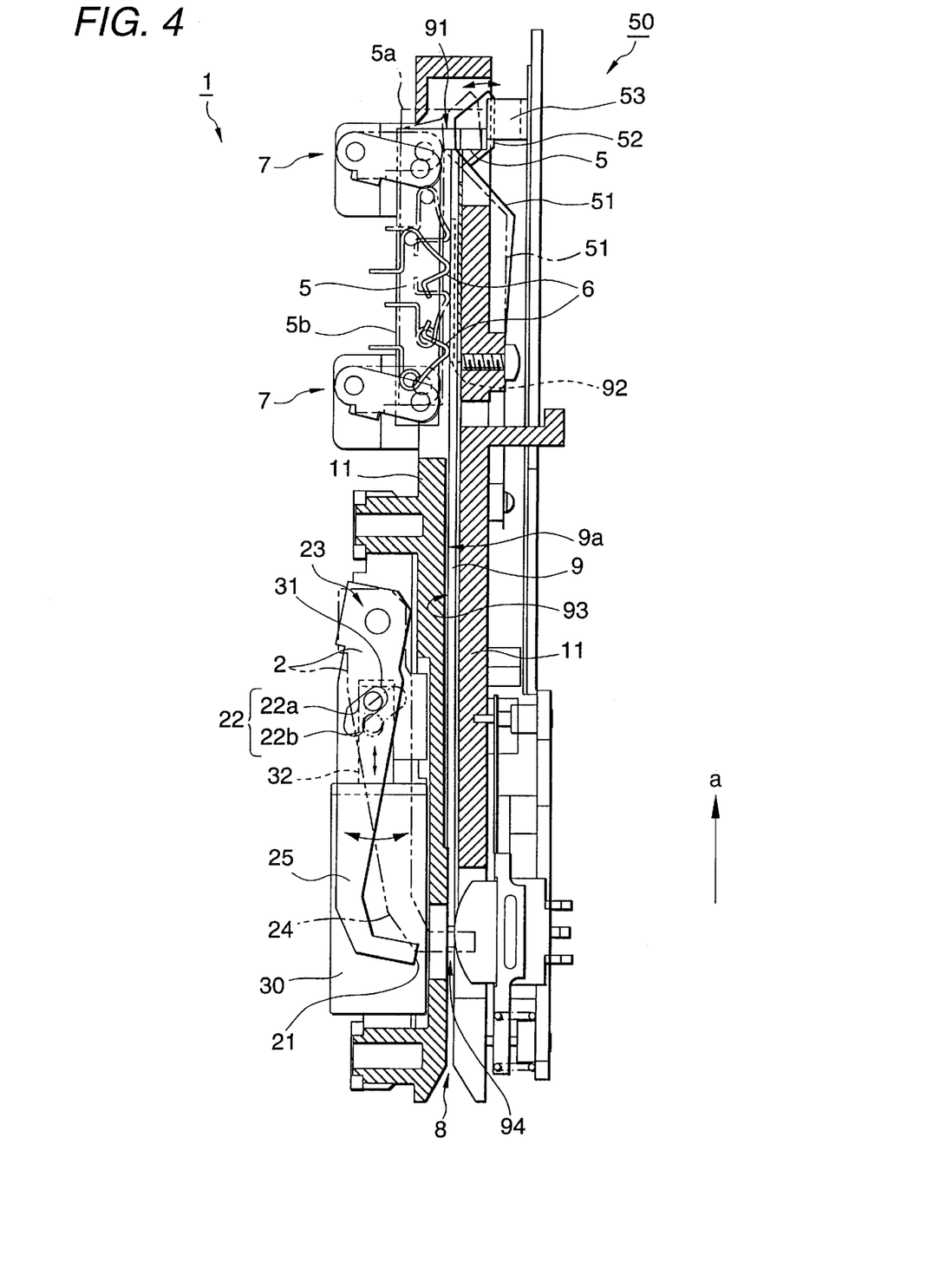
FIG. 4 is a sectional side elevation, taken on line I—I in FIG. 1 showing a modification of the FIG. 1 IC card reader.

Reference is made to FIGS. 1 and 4. As shown, the IC card reader 1 includes a card lock means 20 which, when driven by a solenoid 30, locks an inserted IC card 9 at the card insertion end position 9a. The IC card reader 1 further includes a detecting means 50 arranged so as to detect the inserted IC card 9 at an early stage (FIG. 4). The detecting means 50 is a switch formed with a plate spring, unlike the optical means 40 (FIG. 2).

As best illustrated in FIG. 4, the card lock means 20 is turned about a fulcrum 23 between a locking position 24 where the card is locked and a non-locking position 25. The card lock means 20 includes a lock part 21. When the card lock means 20 is turned to the locking position 24, its lock part 21 is brought into contact with the trailing edge 94 of the inserted IC card 9, and locks lock the inserted card to as to prevent it from being pulled out. More specifically, the lock part 21 is shaped like a hook. At the locking position 24, the thus shaped lock part 21 hooks the trailing edge 94 of the card to prevent the card from being pulled out through the card path 8. The extreme end of the lock part 21, which slidably contacts with the leading edge of the leading edge 93 of the inserted card, is rounded so as not to damage the leading edge 93 of the inserted card, and preferably made of a material hard to damage the card.

An engaging hole 22 is formed in a portion of the card lock means 20, located between the fulcrum 23 and the lock part 21. The engaging hole 22 receives an engaging pin 31 formed at the extreme end of a plunger 32 of the solenoid 30, whereby the card lock means 20 is interlocked with the solenoid 30. The engaging hole 22, elongated and curved as shown in FIG. 4, includes a movement part 22a located deviated from the axis of the plunger 32 and a holder part 22b located substantially coaxially with the plunger axis.

The movement part 22a is continuous to the holder part 22b. In the embodiment, the movement part 22a is positioned closer to a location indicated by the arrow a, or the leading edge 91 of the card, than the holder part 22b, and the engaging hole 22 is curved toward the card path 8. With this structure, in a state that the plunger 32 is stretched out from the solenoid 30, the engaging pin 31 is positioned at the end of the movement part 22a, and the card lock means 20 is put at the non-locking position 25 where the lock part 21 is retracted from the card path 8. Then, the plunger 32 is retracted to the solenoid 30. In this state, the engaging pin 31 slidably moves on the edge of the movement part 22a, and the card lock means 20 is turned to the locking position 24. And the engaging pin 31 is placed at the holder part 22b, and the card lock means 20 is immovably held at the locking position 24. When the plunger 32 is moved in the stretch-out direction by a return spring (coiled) 33, the card lock means 20 is released from its locked state and returned to the non-locking position 25. Thus, the engaging hole 22 is configured so as to guide the card lock means 20 with the movement of the solenoid 30. Incidentally, a motion of the card lock means 20 may be adjusted as desired by properly varying the stroke length of the movement part 22a and the holder part 22b, and an angle of the movement part 22a.

The solenoid 30, which swings the card lock means 20 between the locking position 24 and the non-locking position 25 by the utilization of a reciprocal movement of the plunger 32, is fastened to the frame. The engaging pin 31 is attached to the extreme end of the plunger 32, which takes a reciprocal linear motion, in the direction substantially perpendicular to the axial direction of the plunger 32 (FIG. 1). The return spring 33, disposed around the plunger 32, urges the plunger in the plunger thrust direction. When the solenoid 30 is not energized, the plunger 32 is thrust out by the return spring 33. When it is energized, the plunger is electromagnetically attracted to the solenoid 30. In the embodiment, when the solenoid 30 is energized, the card lock means 20 is turned to the locking position 24 and held there. When it is deenergized, the solenoid 30 is returned to the non-locking position 25.

The detecting means 50 detects the insertion of the IC card 9 into the IC card reader 1 and drives the solenoid 30. The detecting means 50 is disposed so as to detect the arrival of the IC card 9 at the card insertion end position 9a or the card insertion before the inserted card reaches the card insertion end position 9a. In the latter design, the detecting means 50 may be disposed so as to detect the IC card 9, not yet completely inserted. In this case, when the detecting means detects the insertion of the IC card 9, the solenoid 30 is responsively operated to angularly move the card lock means 20, and the extreme end of the lock part 21 comes in contact with the card leading edge 93. When the card is further inserted, the card moves while sliding on the end of the card lock means 20. When the IC card 9 reaches a position near to the card insertion end position 9a, the card lock means 20 slips off from the trailing edge 94 of the card and reaches the locking position 24. The card insertion detection may start at any time point after the leading edge 91 of the card passes the lock part 21 of the card lock means 20.

In the IC card reader 1 shown in FIG. 4, the detecting means 50 is formed with a sensor spring 51 and a photo interrupter 53. One end of the sensor spring 51 is located within the card path 8 so that when the leading edge 91 of the incoming card comes in contact with the spring end, the spring is bent. A shield plate 52 is attached to the other end of the sensor spring 51 such that when the sensor spring 51 is bent by the incoming card, the shield plate 52 is operated to interrupt a light beam passing within the photo interrupter 53. The incoming card 9 is detected through the interruption of the light beam. Alternatively, the detecting means 50 may be formed with the combination of a microswitch and a drive means for driving the former, instead of the combination of the photo interrupter 53 and the sensor spring 51. As already stated, the card insertion detection may start at any time point after the leading edge 91 of the card passes the lock part 21 of the card lock means. In other words, the detecting means 50 may be located at any position succeeding to a position where the card leading edge 91 passes the lock part 21. As described above, the detecting means 50 is disposed so as to detect the card insertion before the card reaches the card insertion end position 9a. This technical feature implies that if the IC card 9 has the freedom of movement when it is locked at the card insertion end position 9a, some measure to prevent the card out of a detection range can be used.

The thus constructed IC card reader 1 has the following advantageous features. The card insertion may be detected within a time range from an instant that the card leading edge 91 passes the end of the lock part 21 till the card reaches the card insertion end position 9a. Because of this, a detection range from the card detection to the arrival of the card at the card insertion end position 9a is long enough. Therefore, if an operator pulls the card being locked out of the IC card reader and the card is somewhat moved in its movement direction, a distance the card is moved is always within the detection range. In other words, in such a case, the card is left in a detection-ready state so long as the card 9 is locked. Thus, there is no chance that during data communication with the card, the card detection is removed and the card is unlocked.

Further, in the IC card reader, the IC card 9 is locked by energizing the solenoid 30. Because of this, the feeding of current to the solenoid 30 only during data communication suffices. Further, if power stoppage accidentally takes place during data communication, the current feeding to the solenoid 30 is also stopped and the card 9 is automatically unlocked. Additionally, such a dangerous situation that the operator cannot pull the card out of the IC card reader at the power stoppage, does not occur.

If the IC card reader 1 shown in FIG. 1 is placed such that the left side of the card reader is located as the upper side and the right side as the upper side, then the card path 8 is vertically directed and hence the card reader may be used as a vertically placed card reader. In this case, the left-hand card contact face 18 of the card path 8 serves as the bottom of the card path, and the contact carriage 2 is located as the upper side with respect to the card contact face 18. Therefore, the arcuately protruded portion 15b of the opening 12 of the frame 11 is preferably used as the carriage movement reference surface where the tip of the arcuately protruded portion is always in contact with the side face 21b of the contact carriage 2. To remove a coin or others mistakenly put into the card path 8, a hole 18A may be formed in the card contact face 18 at a portion located this side of the contacts 6 of the contact carriage 2. In this case, the hole 18A is preferably somewhat wider than the card path 8 to ensure a reliable removal of those mistakenly put into the card path.

As seen from the foregoing description, a contact carriage is provided in an opening formed in a frame having a card path into which an IC card is inserted, and of the opposed side faces of the opening, the side face serving as a carriage movement reference surface when the contact carriage moves with respect to the opening, includes an arcuately protruded portion and a flat portion. With this construction, the contact carriage moving in the opening is positionally regulated and highly accurately positioned. Therefore, the contact array of the contact carriage is accurately brought into contact with a predetermined position of the IC card, and hence reliable data communication is ensured.

What is claimed is:

1. An IC card reader comprising:
   contacts to be in contact with a contact terminal pattern of an IC card;
   a contact carriage moving, with insertion of the IC card, to a card insertion end position and to a contact position where said contacts come in contact with said contact terminal pattern; and
   an opening formed in a frame having a card path into which an IC card is inserted, through which said contact carriage is freely movably provided,
   wherein a side face of said contact carriage, located closer to a carriage movement reference surface used when said contact carriage moves with respect to said opening, and a side face of said opening which faces said side face of said contact carriage are each formed to have an arcuately protruded portion and a flat portion.

2. An IC card reader according to claim 1, wherein the other side face of said contact carriage, located opposite to said carriage movement reference surface, and the other side face of said opening which faces said other side face of said contact carriage are each formed to have an arcuately protruded portion and a flat portion.

3. An IC card reader according to claim 1, wherein said flat portion and said arcuately protruded portion form a carriage movement reference surface, said contact carriage includes a card contact portion which comes in contact with the leading edge of the IC card, and when the IC card pushes said card contact portion of said contact carriage, said contact carriage is moved while being guided by said carriage movement reference surface.

4. An IC card reader according to claim 3, wherein said contacts of said contact carriage are arrayed in two series in the card movement direction.

5. An IC card reader according to claim 4, wherein said contact carriage is obliquely moved by a parallel link mechanism.

6. An IC card reader according to claim 1, further comprising:
   detecting means for detecting arrival of the IC card at the card insertion end position corresponding to movement of said contact carriage.

7. An IC card reader according to claim 6, wherein said contact carriage includes an operating member for operating said detecting means corresponding to the movement of said contact carriage.

8. An IC card reader according to claim 7, wherein said detecting means includes optical means formed with a light emitting part and a light sensing part, and said operating member is a shield plate that may be moved into and out of a space between said light emitting part and said light sensing part.

9. An IC card reader according to claim 7, wherein said card path into which the IC card is inserted is sized so as to receive IC cards of different thickness one by one.

10. An IC card reader according to claim 9, wherein said contact carriage is obliquely moved by a parallel link mechanism.

11. An IC card reader according to claim 6, wherein said IC card reader starts communication with the IC card in response to a detecting output signal of said detecting means.

12. An IC card reader according to claim 1, further comprising:
   a card lock means moved by a solenoid for locking an inserted IC card by a lock part thereof at said card insertion end position.

13. An IC card reader according to claim 12, further comprising:
   a detecting switch for detecting the insertion of the IC card,
   wherein said card lock means is moved to a locking position when said solenoid is energized, and returned to a non-locking position when said solenoid is deenergized, and when the leading edge of the IC card is placed at a position closer to said card insertion end position than said lock part of said card lock means, said solenoid is energized to move said card lock means to said locking position.

14. An IC card reader according to claim 13, wherein said contact carriage includes a card contact portion which comes in contact with the leading edge of the IC card, and said contact carriage is moved when the IC card pushes said contact carriage so that said card contact portion and said lock part cooperate to nip the IC card therebetween.

15. An IC card reader according to claim 13, wherein said detecting switch detects that the IC card reaches said card insertion end position.

16. An IC card reader according to claim 13, wherein said solenoid includes an engaging pin to be engaged with said card lock means, said card lock means has an engaging hole into which said engaging pin is inserted, said engaging hole including a movement part along which said engaging pin move, and a holder part, when said engaging pin is placed at said holder part, said card lock means is immovably held at said locking position.

17. An IC card reader comprising:
   contacts to be in contact with a contact terminal pattern of an IC card;
   a contact carriage for carrying said contacts thereon, said contact carriage moving with insertion of the IC card to a contact position where said contacts come in contact with said contact terminal pattern at a card insertion end position;
   a frame having a card path into which the IC card is inserted;
   an opening formed in said frame so as to allow the movement of said contact carriage therein;
   a carriage movement reference surface for positionally regulating said contact carriage moving in said opening; and
   one of the side face of said contact carriage, which confronts said carriage movement reference surface, and the side face defining said opening, which confronts said side face of said contact carriage being flat, while the other side face being arcuate.

18. An IC card reader according to claim 17, wherein said contact carriage includes a card contact portion which comes in contact with the leading edge of the IC card, and
   wherein when the IC card pushes said card contact portion of said contact carriage, said contact carriage is moved while being guided by said carriage movement reference surface.

19. An IC card reader according to claim 17, further comprising:
   detecting means for detecting the arrival of the IC card at the card insertion end position through the movement of said contact carriage when said contact carriage moves with insertion of the IC card, to a card insertion end position.

20. An IC card reader according to claim 17, further comprising:
   a detecting switch for detecting the insertion of the IC card; and
   a card lock member moved by a solenoid, said lock member including a lock part to lock the IC card at said card insertion end position,
   wherein said card lock member is moved to a locking position when said solenoid is energized, and returned to a non-locking position when said solenoid is deenergized, and when the leading edge of the IC card is placed at a position closer to said card insertion end position than said lock part of said card lock member, said solenoid is energized to move said card lock member to said locking position.

21. An IC card reader according to claim 20, wherein said contact carriage includes a card contact portion which comes in contact with the leading edge of the IC card, contact carriage is moved when the IC card pushes said contact carriage, and said card contact portion and said lock part cooperate to nip the IC card therebetween.

* * * * *